(12) United States Patent
Oster et al.

(10) Patent No.: US 12,523,080 B2
(45) Date of Patent: Jan. 13, 2026

(54) ACTUATOR FOR THE ROTARY DRIVE OF A VEHICLE FLAP

(71) Applicant: Stabilus GmbH, Koblenz (DE)

(72) Inventors: Peter Oster, Koblenz (DE); Andreas Ritter, Hilgert (DE)

(73) Assignee: Stabilus GmbH, Koblenz (DE)

( * ) Notice: Subject to any disclaimer, the term of this patent is extended or adjusted under 35 U.S.C. 154(b) by 99 days.

(21) Appl. No.: 18/603,726

(22) Filed: Mar. 13, 2024

(65) Prior Publication Data

US 2024/0328232 A1    Oct. 3, 2024

(30) Foreign Application Priority Data

Mar. 27, 2023 (DE) .................... 10 2023 107 692.2

(51) Int. Cl.
*E05F 15/614* (2015.01)
*E05F 15/63* (2015.01)
*F16H 57/039* (2012.01)

(52) U.S. Cl.
CPC ............ *E05F 15/614* (2015.01); *E05F 15/63* (2015.01); *F16H 57/039* (2013.01); *E05Y 2900/531* (2013.01)

(58) Field of Classification Search
CPC ...... E05F 15/63; E05F 15/614; F16H 57/039; E05Y 2900/531; E05Y 2201/72; E05Y 2201/434
See application file for complete search history.

(56) References Cited

U.S. PATENT DOCUMENTS

| | | | | |
|---|---|---|---|---|
| 4,121,382 A | * | 10/1978 | Dietrich ................ | E05F 15/614 49/337 |
| 8,585,124 B2 | * | 11/2013 | Oberle .................. | F16H 37/041 74/421 A |
| 9,062,488 B2 | * | 6/2015 | Sasaki ................... | E05F 15/611 |
| 10,384,519 B1 | * | 8/2019 | Brown .................. | E05F 15/649 |
| 10,648,210 B1 | * | 5/2020 | Targhi ....................... | E05D 3/18 |

(Continued)

FOREIGN PATENT DOCUMENTS

| | | |
|---|---|---|
| DE | 102012211020 A1 | 1/2014 |
| DE | 102018131933 A1 | 6/2020 |

(Continued)

OTHER PUBLICATIONS

German Application No. 102023107692.2, Search Report mailed Nov. 30, 2023, 10 pages.

*Primary Examiner* — Justin B Rephann
(74) *Attorney, Agent, or Firm* — Kilpatrick Townsend & Stockton LLP

(57) ABSTRACT

Disclosed is an actuator for the rotary drive of a vehicle flap. The actuator includes an electric motor, which has a output shaft with a center axis, an output unit, which is in force-transmitting connection with the electric motor in such a manner that activation of the electric motor causes a rotational displacement of the output unit about an axis of rotation of the output unit, and a mounting unit which is configured to support the actuator in force-transmitting connection with a superordinate assembly relative to the drive unit such that, upon activation of the electric motor, a displacement of the drive unit relative to the mounting unit takes place. Also disclosed is a storage apparatus for a vehicle door and a motor vehicle.

18 Claims, 9 Drawing Sheets

(56) References Cited

U.S. PATENT DOCUMENTS

| | | | | |
|---|---|---|---|---|
| 12,281,513 | B2* | 4/2025 | Kim | E05F 15/41 |
| 2005/0127711 | A1* | 6/2005 | Rigorth | E05F 15/63 |
| | | | | 296/146.4 |
| 2007/0051046 | A1* | 3/2007 | Yoshida | E05F 15/63 |
| | | | | 49/340 |
| 2013/0199321 | A1* | 8/2013 | Oberle | E05F 15/63 |
| | | | | 74/89.14 |
| 2017/0089116 | A1* | 3/2017 | Heiberger | B62D 33/0273 |
| 2017/0191300 | A1* | 7/2017 | Oster | E05F 15/63 |
| 2018/0080270 | A1* | 3/2018 | Khan | E05F 15/611 |
| 2018/0216384 | A1* | 8/2018 | Rietdijk | E05F 3/16 |
| 2019/0186191 | A1* | 6/2019 | Eguchi | E05F 5/025 |
| 2021/0140516 | A1* | 5/2021 | Gong | F16H 1/46 |
| 2023/0110103 | A1 | 4/2023 | Kim et al. | |
| 2023/0112987 | A1 | 4/2023 | Kim et al. | |
| 2023/0203869 | A1* | 6/2023 | Sproule | E05F 15/77 |
| | | | | 16/49 |

FOREIGN PATENT DOCUMENTS

| | | |
|---|---|---|
| DE | 102022116858 A1 | 4/2023 |
| DE | 102022116864 A1 | 4/2023 |
| WO | 2014000918 A1 | 1/2014 |
| WO | 2020120055 A1 | 6/2020 |

* cited by examiner

ACTUATOR FOR THE ROTARY DRIVE OF A VEHICLE FLAP

CROSS REFERENCE TO RELATED APPLICATION

This application claims priority to German Patent Application No. 10 2023 107 692.2, filed in Germany on Mar. 27, 2023, the entire contents of which are hereby incorporated herein by this reference.

DESCRIPTION

The present invention relates to an actuator for rotationally driving a vehicle flap, particularly a vehicle door.

Actuators are known from the prior art which are variable in length, such that, due to a correspondingly suitable arrangement of the actuator between a vehicle flap and a body of the vehicle, a change in length of the actuator causes a rotational displacement of the vehicle flap about an associated pivot axis. Particularly in the event that a particular vehicle flap has to be moved over a large swivel range, known variable-length actuators may have too short a stroke and may protrude into an opening area of the vehicle flap, which can hinder the use of the vehicle flap.

It is therefore the object of the following invention to provide an actuator which is suitable for rotationally driving a vehicle flap even over a large swivel angle. Further, the object of the invention is to provide a storage apparatus suitable for horizontally displacing a vehicle door. A further object of the invention is to provide a motor vehicle with at least one horizontally displaceable vehicle door and a storage apparatus.

In accordance with the invention, the object is achieved by an actuator for rotationally driving a vehicle flap, particularly a vehicle door, comprising an electric motor which has a output shaft with a central axis about which the output shaft rotates in response to activation of the electric motor, and which is configured to provide a drive force by means of which the vehicle flap can be displaced, an output unit which is in force-transmitting connection with the electric motor in such a manner that activation of the electric motor causes a rotational displacement of the output unit about an axis of rotation of the output unit, and a mounting unit which is configured for this purpose, supporting the actuator in force-transmitting connection with a superordinate assembly relative to the output unit, such that, upon activation of the electric motor, a displacement of the output unit relative to the assembly unit takes place, wherein the center axis of the output shaft of the electric motor is spaced from and substantially parallel to the axis of rotation of the output unit. At this point, it should be noted that the superordinate assembly can be a body or a vehicle flap, for example.

The actuator according to the invention can thus have a direct rotational impact on the vehicle flap to displace it by rotating the output unit relative to the mounting unit and thereby rotationally displacing the vehicle flap relative to the body of the vehicle. Based on this mode of operation, the actuator according to the invention can be arranged directly in the area of a hinge of the vehicle flap on the body of the vehicle, such that an area of the vehicle, which is released by the vehicle flap when it is opened, remains unaffected by components of the actuator. Particularly in connection with the arrangement of the actuator according to the invention in the area of a hinge of a respective vehicle flap, the feature according to the invention that the center axis of the output shaft of the electric motor is spaced apart from and substantially parallel to the axis of rotation of the output unit can lead to a significantly improved utilization of the installation space available for the arrangement of an actuator. This arrangement can lead to an optimized use of installation space, especially for vehicle doors that are pivoted along a horizontal plane, such as doors on buses, trains or autonomous vehicles.

For example, the mounting unit can be in a force-transmitting connection with the vehicle flap, whereas the output unit can be connected to the body of the vehicle, at least in a rotationally fixed manner. For example, the axis of rotation of the output unit or an axis of rotation of the mounting unit around the output unit can be arranged substantially concentrically to a pivot axis of an associated vehicle flap relative to the body of the vehicle. When the electric motor is activated, the mounting unit and, in particular, a gearbox and the housing surrounding it can be moved together with the door relative to the body of the vehicle. In one conceivable embodiment, a tube connected to the vehicle flap and rotating with the door may be provided as an outer part of a hinge of the vehicle door, wherein the tube is rotatably mounted on a shaft which is fixedly connected to the body of the vehicle. The actuator according to the invention can now be arranged in such a manner that the mounting unit is firmly connected, for example screwed, to the tube, and the output unit is connected to the shaft in such a manner that it is at least secured against rotation. This can be realized, for example, by a positive connection in the form of a spline shaft connection between the shaft and the output unit, in which axial displacement relative to one another can be made possible to a predetermined extent without the output unit and the shaft disengaging from one another.

It is also conceivable that the mounting unit is in a force-transmitting connection with the body, whereas the output unit can be at least rotationally fixed by means of a direct or indirect connection with the vehicle flap, i.e. the vehicle door.

Further, the actuator may comprise a gear unit which is configured to provide a transmission ratio between a torque generated by the output shaft of the electric motor and a torque generated by the output unit. This allows high rotational speeds of the electric motor with comparatively low torque to be converted into a lower rotational speed at the output unit with a comparatively higher torque.

The gear unit can comprise at least one, particularly two, worm-worm gearboxes and a spur gearbox. In particular, each gear stage of the gear unit can convert a higher rotational speed with lower torque on its input side into a lower rotational speed with higher torque on its output side. It is further conceivable that components of the actuator combine different functional units integrally in a single component. For example, an integral component may have a worm gear on the output side of a first gear stage and a worm gear on the input side or a spur gear on the input side of a subsequent gear stage. These integral components can either be produced as a one-piece component or assembled from individual subcomponents to form an integral component.

Here, viewed in the direction of force flow from the output shaft of the electric motor to the output unit of the actuator, a first worm-worm gearbox can be arranged first, followed by a second worm-worm gearbox and then a spur gearbox, wherein one output side of the spur gearbox is connected to the output unit, particularly integrally. The arrangement of the two worm-worm gearbox stages in a consecutive manner, particularly in the case where the axes of rotation of the two worms and/or the axes of rotation of the two worm gears are substantially orthogonal to one another (in the case where the two corresponding axes of rotation extend at an angle to one another, viewed in a projection direction orthogonal to the respective two axes of rotation), enables particularly compact space utilization of such a gear unit. As described above, components of the gear unit can have an output-side part of a transmission stage on one side and a drive-side part of a subsequent transmission stage on the opposite side. In such a manner, the output unit can be realized as an output-side longitudinal end of a shaft, which is connected to the output-side element of the last gear stage or the output-side gear of the spur gear and rotates together with it.

Alternatively or additionally, a spur gear on the output side of the spur gearbox can be designed as a segmented spur gear, which is designed with a toothing only over part of the circumference of the spur gear, particularly over an angle of 90° to 180°, preferably over 120°, of the circumference of the spur gear. In particular, the circumferential angle over which the spur gear is toothed can correspond to a predetermined opening angle of the vehicle flap from a fully closed state to a fully open state thereof. This means that if, for example, the vehicle flap describes an angle of 120° from its closed state to its fully open state, the output-side gear of the last gear stage of the gear unit can also only be designed in segments over 120°. Of course, it may be provided that the circumferential angle of the output-side gear, over which the gear is provided with toothing or at least with radially outwardly projecting end stops, is somewhat larger, for example by 2° to 10°, than the totality of the opening angle of the vehicle flap relative to the body of the vehicle about the pivot axis of the vehicle flap, in order to provide a certain safety factor by means of which it is possible to prevent the gear designed in segments from disengaging from the associated drive-side gear of the last gear stage of the gear unit in the extreme positions of the vehicle flap (fully closed/ fully open). Such a segment-like design of the output-side gear or spur gear can further reduce the required installation space of the gear unit.

Advantageously, the mounting unit can be connected to a housing of the actuator, which particularly substantially surrounds only the gear unit, in a force-transmitting manner. The mounting unit can be designed as an integral part of the housing or connected to the housing, for example by screwing. This connection between the mounting unit and the housing can, for example, also comprise a joint arrangement which has at least one pivot axis, wherein the joint arrangement can particularly have two mutually orthogonally aligned pivot axes in the sense of a universal joint. In this manner, the housing can have a pivotable arrangement relative to the mounting unit, but rotational forces can be transmitted between the mounting unit and the housing. With reference to the example given above that the output unit is connected to a vehicle body in a rotationally fixed manner, the housing can thus be rotationally driven relative to the output unit and, above it, the mounting unit and the vehicle flap connected to the mounting unit. The expression that the housing can "substantially only surround the gear unit" can mean here in particular that the electric motor can be arranged at least for the most part, for example more than 90%, particularly completely, outside the housing of the actuator.

The housing can comprise two main shells, between which a seal, particularly a sealing cord, can be arranged in the assembled state of the housing. For example, the gear unit can be assembled in one of the two main housing shells and the housing can subsequently be closed using the second main housing shell. The seal means that the sealed housing can be designed to be particularly watertight and dustproof.

Advantageously, a portion of an inner wall of the housing can be configured to provide an axial end location for a shaft arranged within the housing.

For this purpose, the housing may have stiffening ribs on one exterior side, which project outwards from the housing exterior and extend radially away from the axial end location for the shaft and/or around the axial end location for the shaft in a concentric manner. Thus, a shaft can be directly supported by the housing in such a manner that a counter stop is provided for the shaft at its corresponding longitudinal end, wherein rotation of the shaft in the axial end location formed by the housing is still possible.

In a further embodiment of the present invention, the actuator may further comprise a braking unit, particularly a switchable braking unit, which is configured to prevent a relative displacement between the output unit and the mounting unit. The term "prevent" should be understood here particularly to mean that a relative displacement between the output unit and the mounting unit can be blocked against forces that are usual in the area of application of vehicle flaps and that impact on the vehicle flap, such as manual forces of a user, a gravitational force impacting on the vehicle flap and/or wind loads. The braking unit can be displaced between a released position, in which a relative displacement between the output unit and the mounting unit is enabled, and an engaged position, in which this relative displacement is prevented, for example using an electromagnetic force and/or a spring force. Consequently, the braking unit can prevent the vehicle flap from being displaced from a predetermined position relative to the body of the vehicle, particularly the fully closed relative position of the vehicle flap and/or the fully open relative position of the vehicle flap.

Further, the actuator can comprise a clutch which is configured to interrupt the power transmission from the output shaft of the electric motor to the output unit in its disengaged state or to produce this in its engaged state. By using a coupling in the actuator according to the invention, a relative displacement between the output unit and the mounting unit, and thus between the vehicle flap and the body of the vehicle, can be released without having to overcome the self-locking forces of the electric motor. This means that in the disengaged state of the clutch, the vehicle flap can be displaced relative to the body of the vehicle, particularly in a simple manner by a user. For example, in an emergency situation, the vehicle flap can be easily opened by an occupant of the vehicle.

Such a clutch can be realized, for example, wherein the clutch can comprise a first gear which has a toothing pointing radially inwards and a second gear which has a toothing pointing radially outwards, wherein the first gear and/or the second gear are/is displaceable between a relative position in which the two gears mesh with one another to form the engaged state of the clutch and a relative position in which the two gears are disengaged from one another to form the disengaged state of the clutch. In other words, a determined component of the gear unit can be divided into two subcomponents in relation to the power flow through the components of the gear unit from the electric motor to the output unit, which can be displaced relative to one another into a power-transmitting (engaged) state and a disengaged (disengaged) state. Of course, as an alternative to the form closure in a substantially radial direction between the two subcomponents (first gear and second gear) described above, a form closure in a substantially axial direction can also be provided, in relation to an axis of rotation of the first gear or the second gear.

In particular, the clutch can be displaced between its engaged state and its disengaged state using a further electric motor, which is designed separately from the electric motor of the actuator. It should be added at this point that the electric motor for driving the actuator drive can be designed to be separately controllable, particularly from the other electric motor for driving the clutch, so that controlling the clutch can be actuated independently of controlling the electric motor for driving the actuator drive. The electric motor may particularly have a output shaft which, for example, is threadedly engaged with a portion of the clutch in order to be able to displace the clutch between its engaged state and its disengaged state, and vice versa.

Further, the clutch can comprise a spring-elastic element, particularly a pressure spring, which is configured to preload the clutch in the direction of its disengaged state. The additional electric motor or its output shaft can be connected to a switching element, for example. If the additional electric motor is now activated and its output shaft is actuated in a corresponding direction of rotation, at least one of the force-transmitting elements of the clutch can be displaced away from it in the direction of the engaged state via the switching element. This displacement can take place against the spring force of the resilient element. As long as the additional electric motor is supplied with current, the engaged state of the clutch can be maintained against the spring force of the spring-elastic element. However, if the power supply to the other electric motor fails, for example due to a general system failure of the vehicle, the spring force of the resilient element can impact on the at least one force-transmitting element of the clutch in such a manner that the clutch is transferred to its disengaged state. In this manner, a safety mechanism is provided in the event of a fault in the actuator or the vehicle, so that an associated vehicle flap can simply be opened manually, as it does not have to be displaced against the self-locking mechanism of the electric motor when the clutch is disengaged.

Alternatively or additionally, it is also conceivable that the switching element itself has spring-elastic properties and is configured to preload the clutch in the direction of its engaged state. Such a switching element can have an impact on at least one of the force-transmitting elements of the clutch when the additional electric motor displaces the clutch in the direction of its engaged state. For example, the additional electric motor or its output shaft can be connected to the switching element and be configured to act on the switching element in such a manner that a spring force, which acts through the switching element on at least one of the force-transmitting elements of the clutch in the direction of the engaged state thereof, can be increased or decreased depending on the direction of rotation of the additional electric motor. The effect of the switching element can ensure that, in the event that engagement is not possible in the current relative position of the force-transmitting elements of the clutch, the engaged state of the clutch can be achieved at the next possible point in time or at the next possible relative position. Using the example of the two gears described, which have a form closure with one another in a radial direction (radial internal toothing of the first gear meshes with radial external toothing of the second gear), it can happen that the two gears are in such a relative position to one another that, viewed in the axial direction thereof, teeth of the first gear overlap with teeth of the second gear, so that the two gears cannot mesh with one another when they are displaced towards one another, but instead abut against one another. The elastic switching element can now act on the second gear in such a manner that it can be brought into form closure with the first gear as soon as the first gear has been displaced relative to the second gear by the impact of the electric motor of the actuator to such an extent that the teeth of the first gear and the second gear can engage with one another, i.e. the teeth of the first gear are superimposed in the axial direction by recesses of the second gear.

The object is further achieved by a storage apparatus for a vehicle door, comprising at least one joint arrangement which comprises at least one coupling rod, wherein the coupling rod is pivotably connected at its first end to a vehicle body, a pivot element to which the coupling rod is pivotably connected at its second end, an actuator which is connected to the vehicle body or the vehicle door and which is configured to displace the pivot element horizontally relative to the vehicle body when activated.

The joint arrangement may comprise two coupling rods arranged parallel to one another and laterally spaced apart, wherein one of the coupling rods is provided to be rotatably driven by means of the actuator.

The object is further achieved by a motor vehicle with at least one horizontally displaceable vehicle door and a storage apparatus. Such movable vehicle doors are used in buses or trains, for example, and lead to optimized use of installation space. The invention is also particularly applicable to autonomous vehicles, as other door concepts are generally provided here.

The present invention will be described in greater detail below on the basis of an embodiment, with reference to the accompanying drawings. In the figures.

Figure 1:
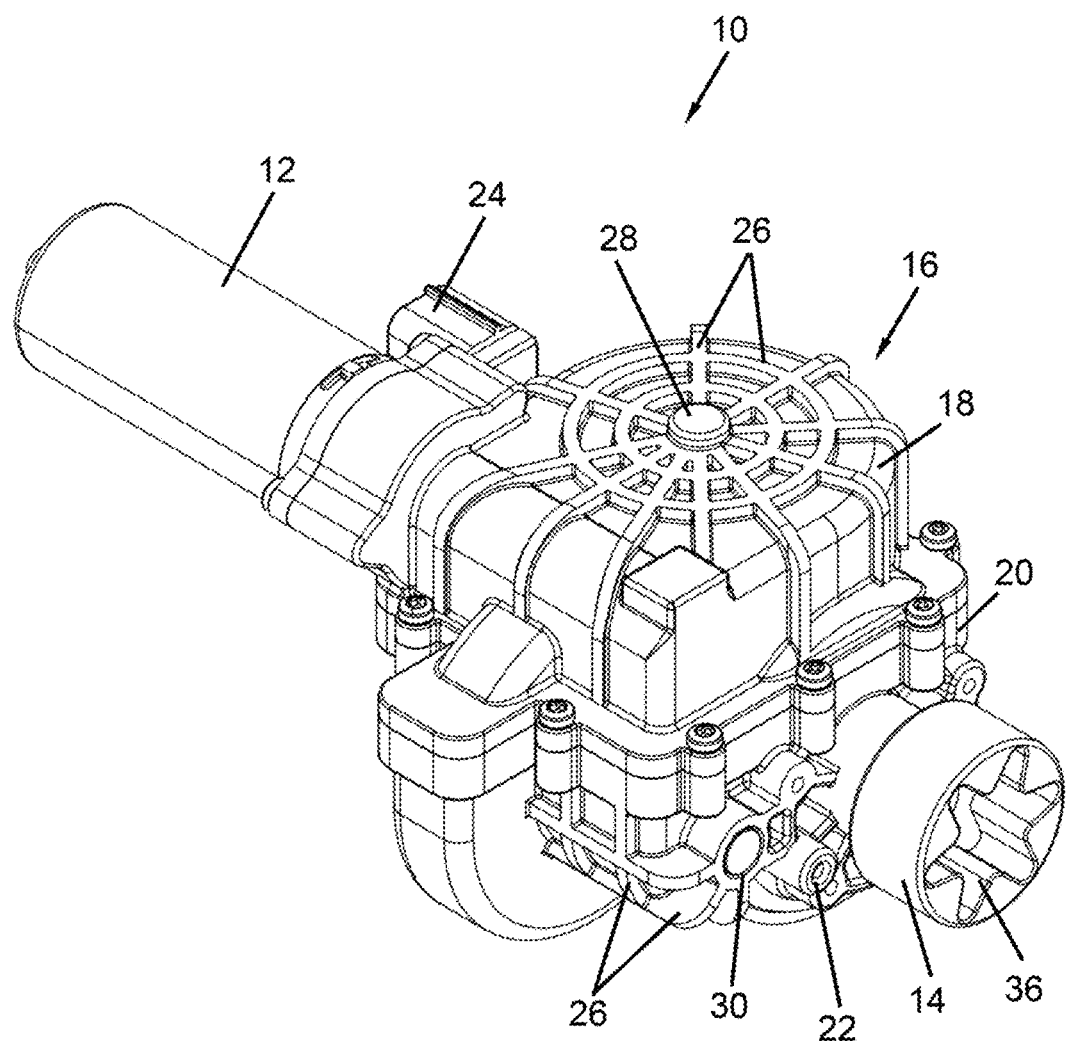
FIG. 1 shows a perspective view of an actuator according to the invention.

In FIG. 1, an actuator according to the invention is generally designated by the reference numerals 10. The actuator 10 comprises an electric motor 12, which is configured to provide a drive force in order to displace elements connected to the actuator 10, such as a vehicle door, relative to a body of the vehicle. In this case, the actuator 10 comprises an output unit 14, which is opposite to the electric motor 12 with respect to the force flow of the actuator 10 and which can be driven by the electric motor 12. Further, the actuator 10 comprises a housing 16, which is formed here from a first housing main shell 18 and a second housing main shell 20.

In order to be able to connect the housing 16 to a superordinate assembly in a force-transmitting manner, the actuator 10 comprises a mounting unit 22, which is designed here as an integral component of the housing 16 or, in the embodiment shown, of the lower main housing shell 20. In this manner, in the event that a vehicle flap is connected to the output unit 14 to be displaceable relative to a body of the vehicle under the impact of the electric motor 12, the housing 16 can be connected to the body of the vehicle via the mounting unit 22 to provide torque support. In the event that the vehicle flap to be displaced is connected to the mounting unit 22, the torque support may be provided by a connection of the output unit 14 to the body of the vehicle, such that upon activation of the electric motor 12, the electric motor 12 and the housing 16 together with the vehicle flap displace relative to the body of the vehicle.

In order to be able to supply the electric motor 12 with current and/or control signals, it has a connection unit 24, which can be connected to a corresponding plug of a cable (not shown).

Furthermore, it can be seen in FIG. 1 that the housing 16 has stiffening ribs 26 on its exterior side, which are configured to stiffen the housing 16 or the main housing circuits 18 and 20. In this case, the stiffening ribs 26 extend radially and concentrically to a respective shaft bearing 28 and 30, which is configured to receive a respective shaft 32 or 34, or more precisely its axial longitudinal end, therein and to provide it with an axial end stop and/or a rotational bearing.

In the embodiment shown here, the output unit 14 has a recess 36 on its radially inner side, which is configured to enter into a torque-transmitting engagement in the manner of a spline shaft with a matching protrusion of a superordinate assembly, such as the vehicle door or the body of the vehicle.

Figure 2:
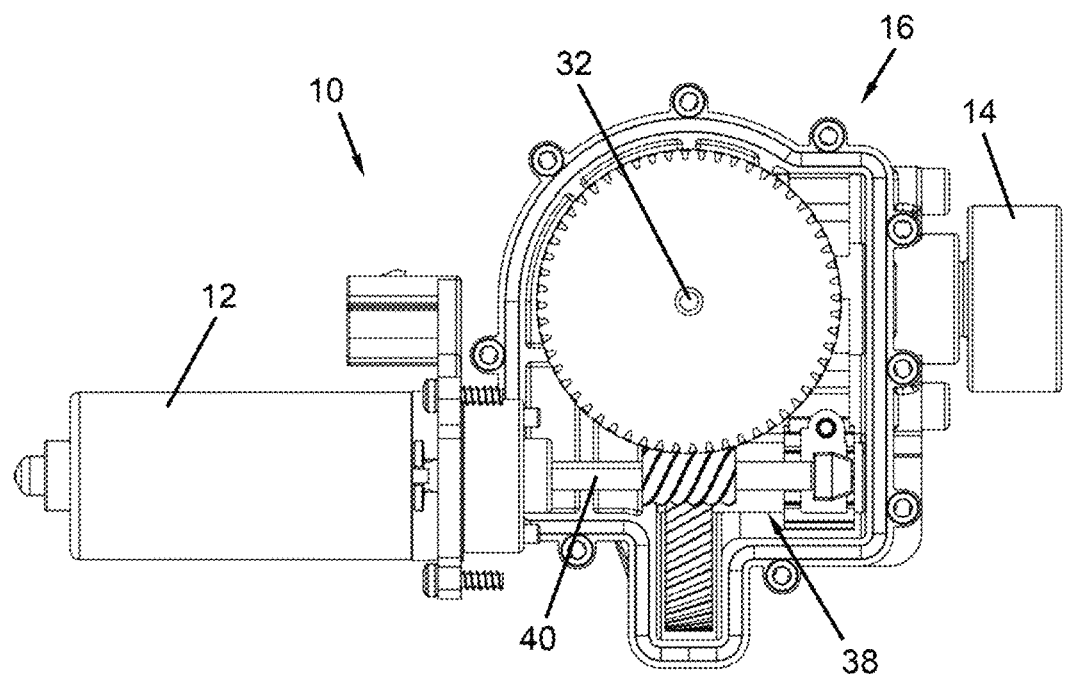
FIG. 2 shows a side view of the actuator from FIG. 1, wherein an upper main housing shell has been removed and thus a gear unit can be seen in a first embodiment.
Figure 3:
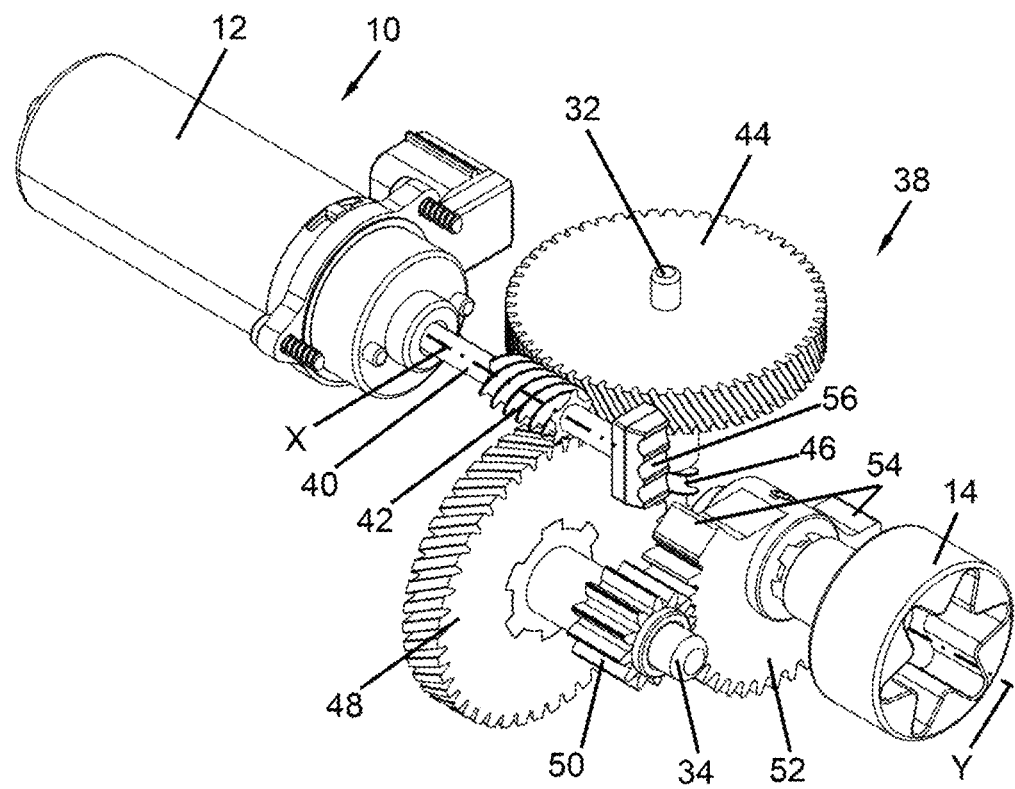
FIG. 3 shows a perspective view of the actuator from FIG. 2, wherein the housing has been completely hidden.

FIG. 2 shows that a gear box unit 38 is arranged inside the housing 16, which is configured to provide a transmission ratio between a output shaft 40 of the electric motor 12 and the drive unit 14. With reference to FIG. 3, it can be seen that the output shaft 40 of the electric motor 12 is connected to a first worm 42 or the first worm 42 is integrally designed on the output shaft 40 of the electric motor 12, wherein the first worm 42 meshes with a first worm gear 44, wherein the first worm gear 44 is connected to or integrally designed with the shaft 32 and rotates together therewith about a center axis thereof. The first worm 42 and the first worm gear 44 together form a first gear stage. At its lower longitudinal end in FIG. 3, the shaft 32 has a second worm 46, which in turn meshes with a second worm gear 48. The second worm 46 and the second worm gear 48 together form a second gear stage. The second worm gear 48 is connected to the shaft 34 or designed integrally therewith and rotates together with it about its central axis. At the longitudinal end of the shaft 34, which is opposite the second worm gear 48, this is connected to a first spur gear 50 in such a manner that a rotation of the second worm gear 48 can be transmitted to the first spur gear 50 via the shaft 34. The first spur gear 50 meshes with a second spur gear 52, such that the first spur gear 50 and the second spur gear 53 together form a third gear stage of the gear box unit 38 of the actuator 10.

As represented in FIG. 3, a center axis X of the output shaft 40 of the electric motor 12 extends substantially parallel, but at a distance, to an axis of rotation Y about which the output unit 14 rotates together with the second spur gear 52.

The second spur gear 52 is designed here as a segment gear, wherein a circumferential angle, over which the second spur gear 52 is provided with gearing, is at least as large as an opening angle of the vehicle flap between a fully closed state and a fully open state of the vehicle flap relative to the body of the vehicle. In order to prevent the second spur gear 52 from rotating beyond the toothing segment area in such a manner that the second spur gear 52 disengages from the first spur gear 50, a respective end stop 54 is provided here at the respective ends of the toothing area of the second spur gear 52, which projects radially outwards on the second spur gear 52 in such a manner, that the respective end stop 54 blocks the first spur gear 50 in such a manner that no further rotation of the first spur gear 50 relative to the second spur gear 52 can take place in this direction, which in turn can prevent the first spur gear 50 and the second spur gear 52 from disengaging from one another.

FIG. 3 also shows that a central axis of the shaft 32 is substantially orthogonal and skewed to a central axis of the shaft 34.

The output shaft 40 is provided with an end stop at its longitudinal end opposite the electric motor 12, against which the longitudinal end of the output shaft 40 rests. The end stop 56 comprises an elastic element, for example to be able to absorb a temperature-induced change in length of the output shaft 40. The end stop 56 can in turn be supported against an inner side of the housing 16.

Figure 4:
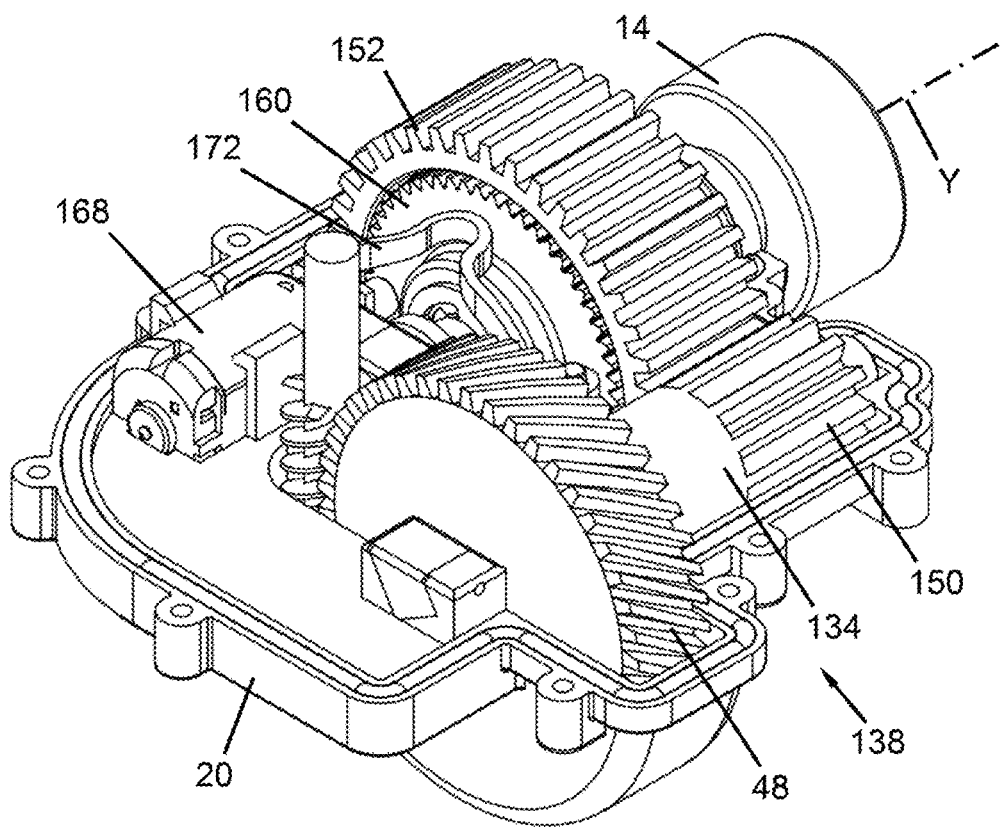
FIG. 4 shows a detailed view of a second embodiment of a gear unit of the actuator according to the invention.
Figure 5:
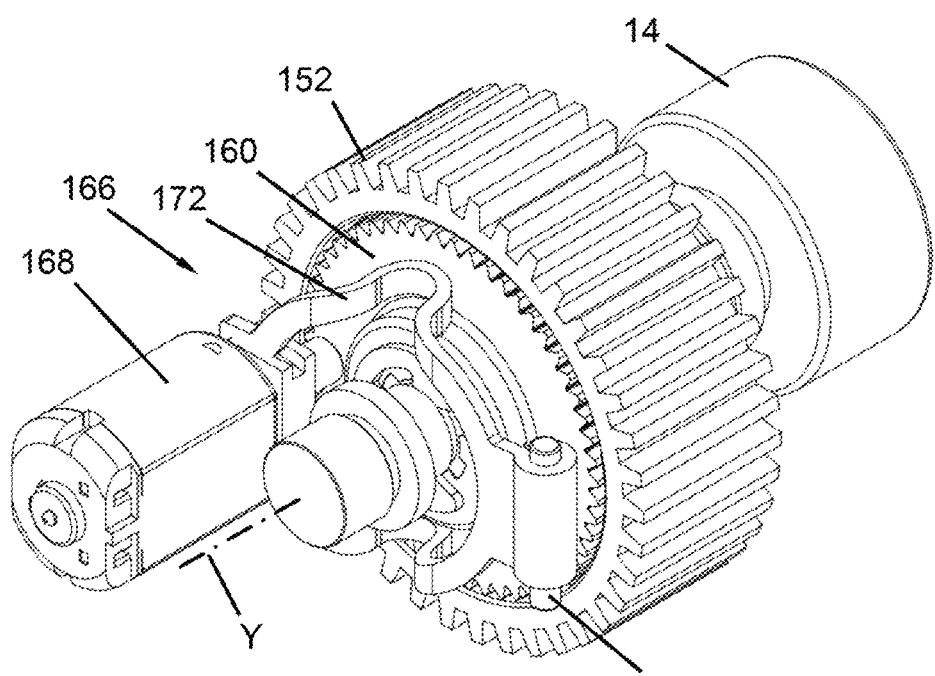
FIG. 5 shows a detailed view of the gear unit from FIG. 4.

FIG. 4 shows a second embodiment of a gear unit that can be used in an actuator 10 according to the invention. Here, analogous components to the gear box unit 38 are designated with analog reference numerals, but increased by the number 100. Identical components to the gear box unit 38 are also designated with identical reference numerals in the second embodiment of the gear box unit 138. Thus, the gear box unit 138, viewed in the direction of force flow from the electric motor 12 to the output unit 14, up to the second worm wheel 48 can be identically designed compared to the gear box unit 38. Here, the first spur gear 150 is integrally designed on the shaft 134 in the gear box unit 138. Further, the second spur gear 152 is not, like the second spur gear 52 of the gear box unit 38, designed only in segments, but the second spur gear 152 has spur gear teeth over its entire outer circumference.

Figure 6:
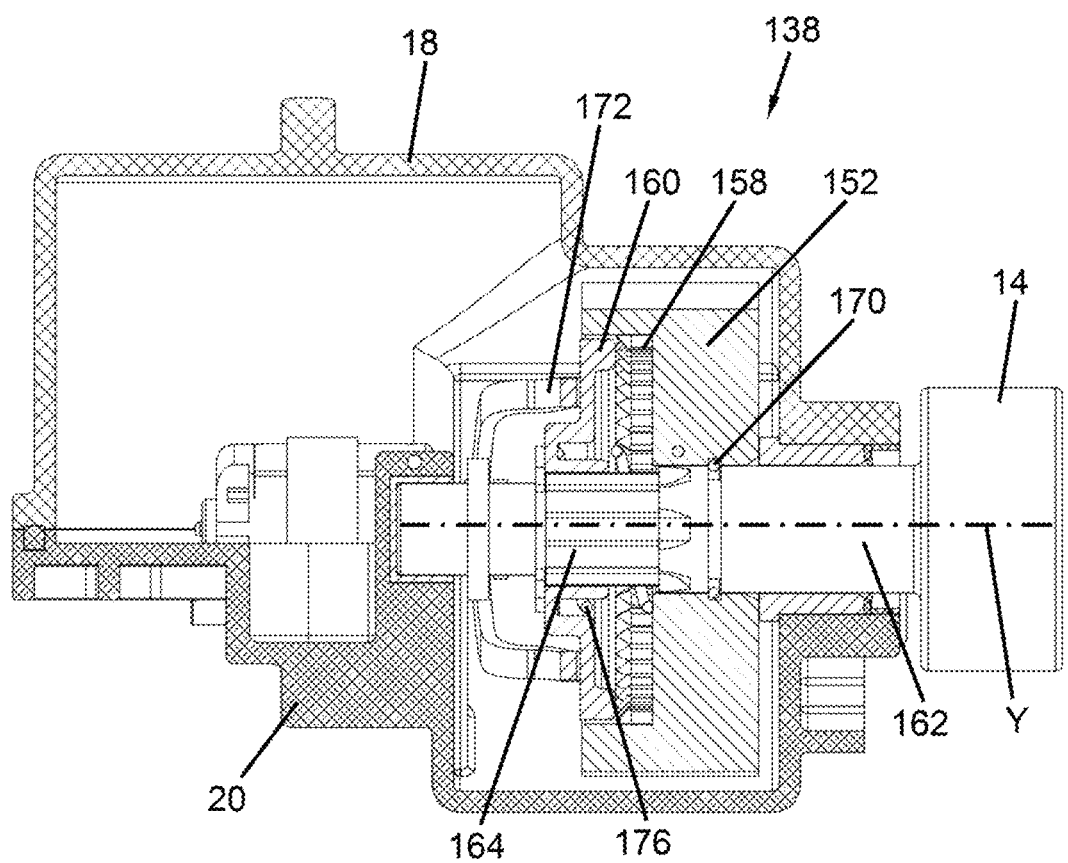
FIG. 6 shows a side cross-sectional view of the gear unit from FIG. 4.
Figure 7:
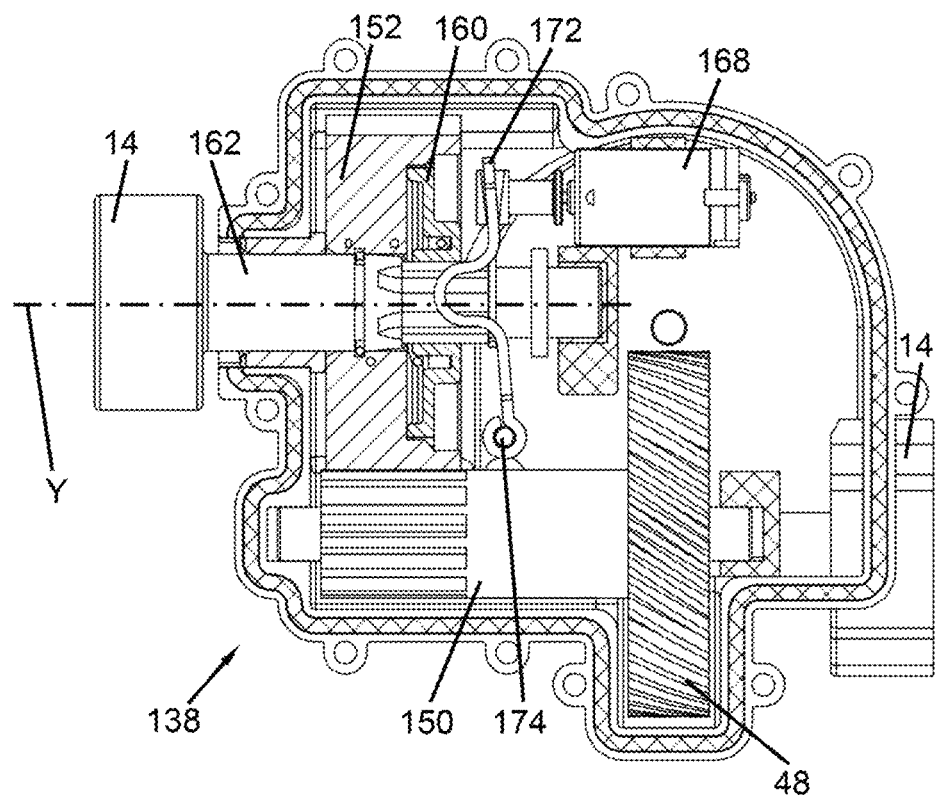
FIG. 7 shows a side cross-sectional view of the gear unit from FIG. 4 in an engaged state.
Figure 8:
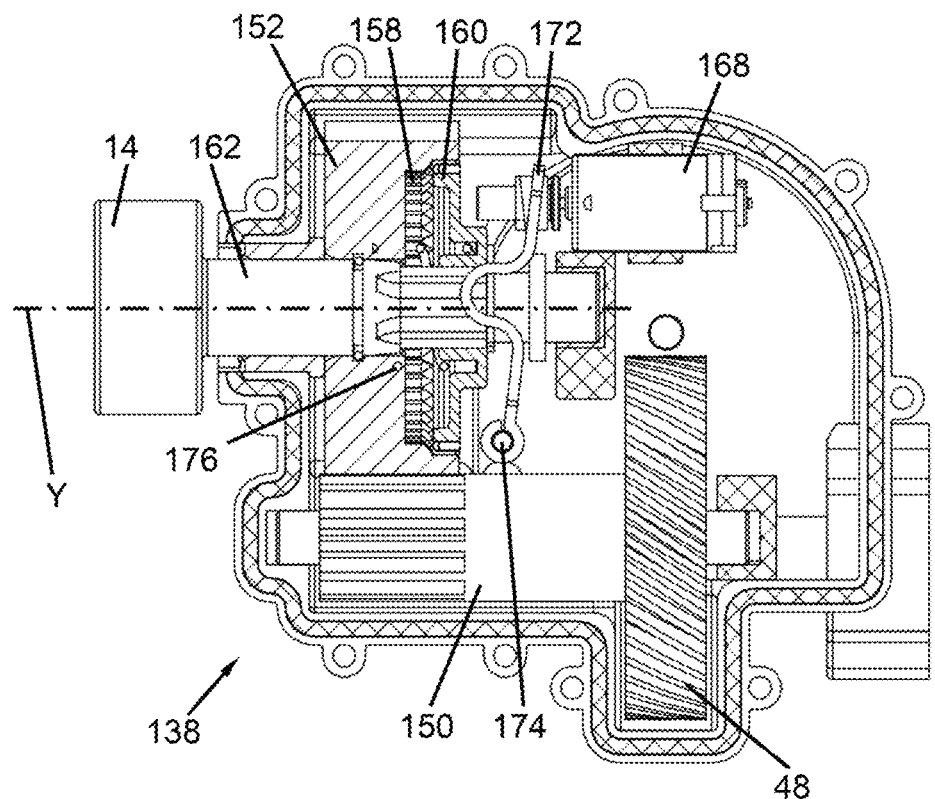
FIG. 8 shows a side cross-sectional view of the gear unit from FIG. 4 in a disengaged state.
Figure 9:
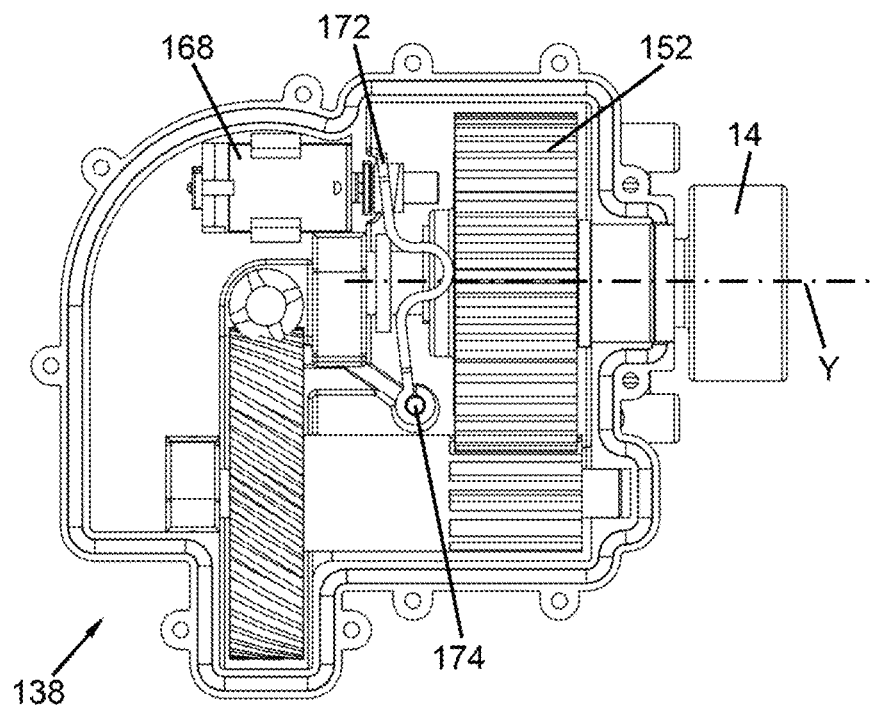
FIG. 9 shows a side view of the gear unit from FIG. 4 in a disengaged state, wherein part of the housing has been hidden.

In addition, the second spur gear 152 has a toothing 138 on its radially inner side (see, for example, FIGS. 6 and 8), which is configured to mesh with a further spur gear 160 or with a toothing formed on the outer circumference of the further spur gear 160. Here, the further spur gear 160 is mounted on a shaft 162 connected to the output unit 14, in particular here a spline shaft portion 164 of the shaft 162, in such a manner that the further spur gear 160 can be displaced along the axis Y relative to the shaft 162 or relative to the second spur gear 152, wherein it always remains in a torque-transmitting connection with the shaft 162 (here the spline shaft portion 164 thereof) (see FIG. 6). The second spur gear 152 and the further spur gear 160 thus form the force-transmitting components of a clutch 166. In the second embodiment of the gear box unit 138 shown here, the further spur gear 160 is displaced via a further electric motor 168 between a disengaged state shown in FIGS. 6, 8 and 9 and an engaged state shown in FIG. 7. In the disengaged state of the clutch 166, the drive force of the electric motor 12 is transmitted via the first spur gear 150 to the second spur gear 152, which, however, then rotates freely on the shaft 162 without being able to transmit a torque to it. The second spur gear 152 is secured relative to the shaft 162 only in the direction of the axis of rotation Y using a snap ring 170. However, in the engaged state of the clutch 166, the torque of the second spur gear 152 can be transmitted to the further spur gear 160 via the engagement of the second spur gear 152 with the further spur gear and via the spline shaft portion 164 to the shaft 162 and thus to the output unit 14.

In FIGS. 4 to 9 it can be seen that the further electric motor 168 does not act directly on the further spur gear 160, but that the further electric motor 168 acts on a switching element 172, which is rotatably mounted about a pin 174 at its longitudinal end, which is opposite the connection with the further electric motor 268. In this case, the switching element 172, in response to a corresponding activation of the further electric motor 168 in a corresponding direction of rotation, can act on the further spur gear 160 in such a manner that the latter is preloaded towards the second spur gear 152 and thus in the direction of engagement with the second spur gear 152. The switching element 172 can itself be designed to be resilient in such a manner that, in the event that the second spur gear 152 and the further spur gear 160 have a relative position to one another in which they cannot engage with one another along the displacement direction Y (tooth is in contact with tooth), it is ensured that a form closure can be achieved between the respective toothing of the second spur gear 152 and the further spur gear 160 at the next possible point in time of a suitable relative position.

In order to achieve a disengagement of the further spur gear 160 from the second spur gear 152 when the further electric motor 168 is activated in a corresponding direction of rotation and an associated displacement of the resilient element 172 in the direction of the position matching the disengaged state of the clutch 166, a resilient element 176 (in the embodiment shown, a pressure spring 176) is arranged between the second spur gear 152 and the further spur gear 160, the spring force of which forces the further spur gear 160 out of engagement with the second spur gear 152. The resilient element 176 can particularly exert a force on the switching element 172 and thus on the further electric motor 168 in such a manner that the disengaged state of the clutch 166 is automatically reached when a power supply to the further electric motor 168 is switched off or fails, for example due to a system failure of the vehicle.

Figure 10:
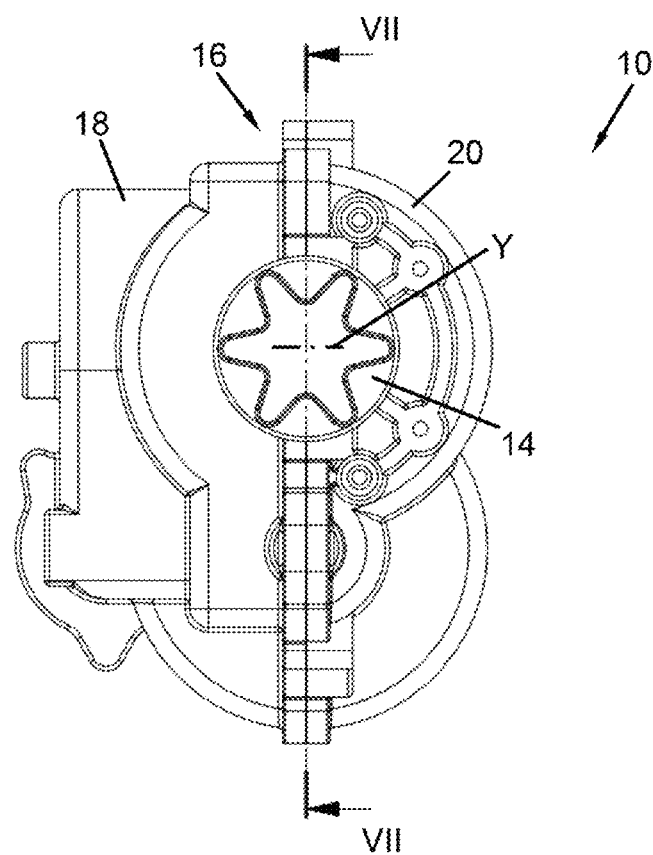
FIGS. 10 to 12 show side views of the actuator according to the invention from FIG. 1.
Figure 11:
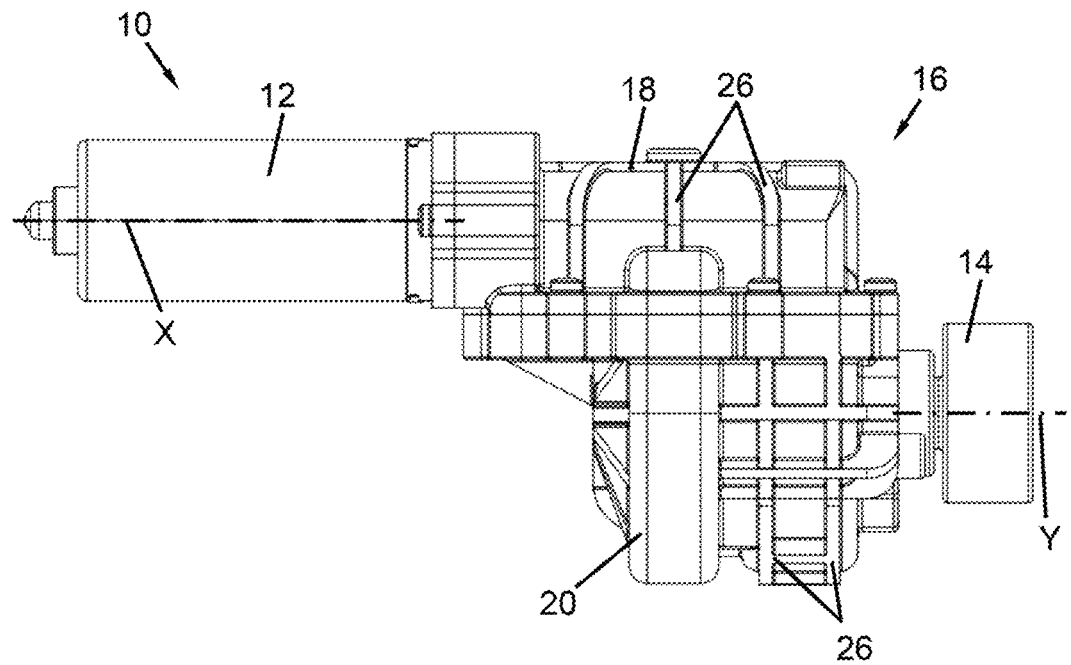
Figure 12:
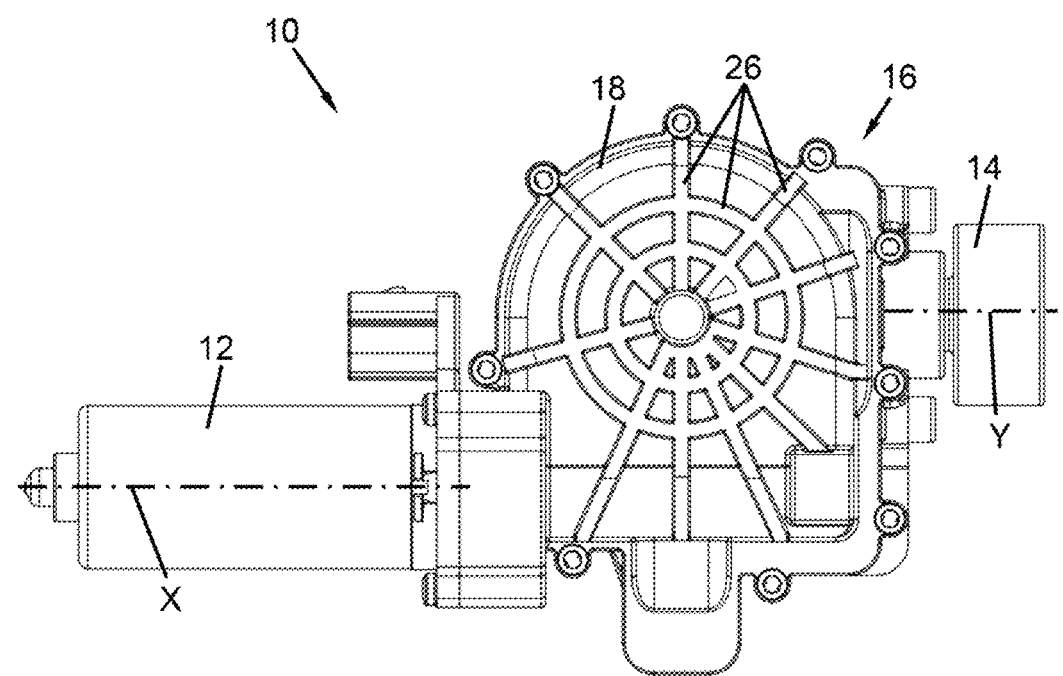

FIGS. 10 to 12 show different side views of the actuator 10 according to the invention, wherein it can be seen in particular how the center axis X of the output shaft 40 of the electric motor 12 is spaced from the axis of rotation Y of the output unit 14 and is substantially parallel.

Figure 13:
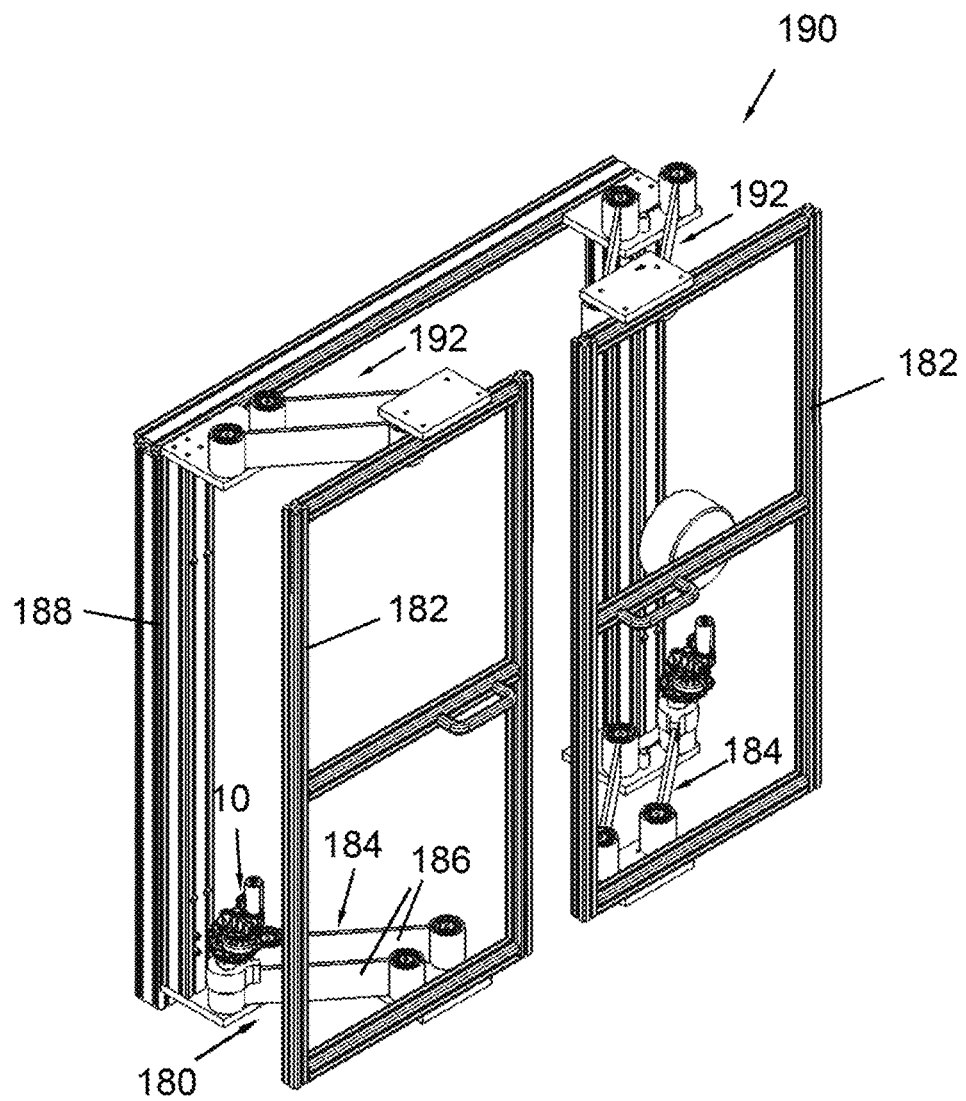
FIG. 13 shows a perspective view of a motor vehicle model according to the invention with two vehicle doors.

FIG. 13 shows a vehicle model 192 with two vehicle doors 182 which are pivoted along a horizontal plane. Swing/swivel doors of this type are used, for example, in buses or trains or in autonomous vehicles and lead to an optimized use of installation space. Depending on the application, one or two vehicle doors 182 may be provided.

Figure 14:
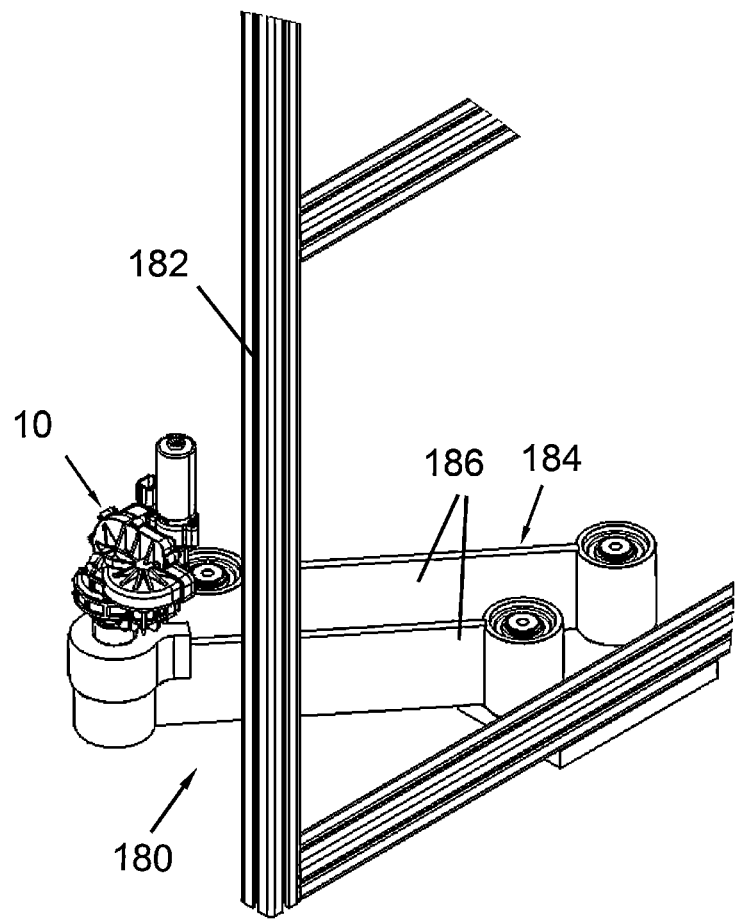
FIG. 14 shows a perspective view of a storage apparatus according to the invention.

A storage apparatus 180 according to the invention for a vehicle door 182, which is represented in an enlarged section in FIG. 14, comprises a joint arrangement 184 arranged on the underside of the door, which has at least one coupling rod 186. A first end of the coupling rod 186 is directly or indirectly pivotally connected to a superordinate vehicle subassembly, which represents a vehicle body 188. A second end of the coupling rod 186 is directly or indirectly pivotally connected to the vehicle door 182, wherein the vehicle door 182 represents a pivot element 190.

In the exemplary embodiment shown, the joint arrangement 184 comprises two coupling rods 186 arranged parallel to one another and laterally spaced apart from one another and forms a four-bar arrangement, wherein one of the coupling rods 186 is provided to be rotationally drivable by means of an actuator 10 described above. For this purpose, the output unit 14 is in a torque-transmitting engagement with a matching protrusion of the joint arrangement 184 by means of the recess 36, for example. The housing 16 or the mounting unit 22 is non-rotatably arranged on the superordinate assembly, in this case the body 188 of the vehicle.

When the control element 10 is activated, the described rotational displacement of the output unit about an axis of rotation of the output unit is caused, which results in a rotational displacement of the coupling rods 186 and thus a horizontal displacement of the vehicle door 182 in the opening or closing direction.

As can be seen from FIG. 13, the vehicle door 182 can be mounted on the top of the door by means of a second four-bar arrangement 194.

The invention claimed is:

1. An actuator for rotationally driving a vehicle flap, the actuator comprising:
    an electric motor which has an output shaft with a central axis about which the output shaft rotates in response to activation of the electric motor, and which is configured to provide a drive force by means of which the vehicle flap can be displaced;
    an output unit which is in force-transmitting connection with the electric motor in such a manner that activation of the electric motor causes a rotational displacement of the output unit about an axis of rotation of the output unit; and
    a mounting unit which is configured to support the actuator in force-transmitting connection with a superordinate assembly relative to the output unit, such that, upon activation of the electric motor, a displacement of the output unit relative to the mounting unit takes place,
    wherein the center axis of the output shaft of the electric motor is spaced from and substantially parallel to the axis of rotation of the output unit,
    wherein the actuator comprises a clutch which is configured to interrupt power transmission from the output shaft of the electric motor to the output unit in its disengaged state or to produce the same in its engaged state,
    wherein the clutch comprises a first gear, which has a toothing pointing radially inwards, and a second gear, which has a toothing pointing radially outwards, wherein the first gear and/or the second gear is/are displaceable between a relative position in which the first and second gears mesh with one another to form the engaged state of the clutch and a relative position in which the first and second gears are disengaged from one another to form the disengaged state of the clutch.

2. The actuator according to claim 1,
    wherein the mounting unit is in force-transmitting connection with the vehicle flap, and wherein the output unit is connected to a body of a vehicle at least in a rotationally fixed manner.

3. The actuator according to claim 1,
    wherein the actuator comprises a gear box unit which is configured to provide a transmission ratio between a torque generated by the output shaft of the electric motor and a torque generated by the output unit.

4. The actuator according to claim 3,
    wherein the gear box unit comprises at least one wormworm gearbox and a spur gearbox.

5. The actuator according to claim 4,
wherein, viewed in a direction of force flow from the output shaft of the electric motor to the output unit of the actuator, first a first worm-worm gearbox of the at least one worm-worm gearbox, then a second worm-worm gearbox of the at least one worm-worm gearbox and then a spur gearbox are arranged, wherein an output side of the spur gearbox is connected to the output unit.

6. The actuator according to claim 4,
wherein a spur gear on an output side of the spur gearbox is designed as a segmented spur gear, which is designed with a toothing only over part of a circumference of the spur gear.

7. The actuator according to claim 3,
wherein the mounting unit is connected in a force-transmitting manner to a housing of the actuator.

8. The actuator according to claim 7,
wherein the housing comprises two main housing shells, between which, in an assembled state of the housing, a seal is arranged.

9. The actuator according to claim 7,
wherein a portion of an inner wall of the housing is configured to provide an axial end location for a shaft which is arranged within the housing.

10. The actuator according to claim 9,
wherein the housing has stiffening ribs on an exterior side, which ribs project outwards from the housing exterior and extend radially away from the axial end location for the shaft and/or around the axial end location for the shaft in a manner concentric thereto.

11. The actuator according to claim 1,
wherein the actuator further comprises a braking unit, which is configured to prevent relative displacement between the output unit and the mounting unit.

12. The actuator according to claim 1,
wherein the clutch can be displaced between its engaged state and its disengaged state using a further electric motor, which is designed separately from the electric motor of the actuator.

13. The actuator according to claim 1,
wherein the clutch comprises a resilient element which is configured to preload the clutch in a direction of its disengaged state.

14. A storage apparatus for a vehicle door, comprising:
at least one joint arrangement comprising at least one coupling rod, wherein the coupling rod is pivotably connected at its first end to a vehicle body;
a pivot element, wherein a second end of the coupling rod is pivotably connected to the pivot element; and
an actuator according to claim 1, which is connected to a vehicle body or a vehicle door and which is configured to displace the pivot element horizontally relative to the vehicle body when activated, wherein a joint arrangement comprises two coupling rods arranged parallel to one another and laterally spaced apart from one another, wherein one of the coupling rods is provided to be rotationally drivable by means of the actuator.

15. A motor vehicle having at least one horizontally pivotable vehicle door and a storage apparatus according to claim 14.

16. An actuator for rotationally driving a vehicle flap, the actuator comprising:
an electric motor which has an output shaft with a central axis about which the output shaft rotates in response to activation of the electric motor, and which is configured to provide a drive force by means of which the vehicle flap can be displaced;
an output unit which is in force-transmitting connection with the electric motor in such a manner that activation of the electric motor causes a rotational displacement of the output unit about an axis of rotation of the output unit; and
a mounting unit which is configured to support the actuator in force-transmitting connection with a superordinate assembly relative to the output unit, such that, upon activation of the electric motor, a displacement of the output unit relative to the mounting unit takes place,
wherein the center axis of the output shaft of the electric motor is spaced from and substantially parallel to the axis of rotation of the output unit,
wherein the actuator comprises a gear box unit which is configured to provide a transmission ratio between a torque generated by the output shaft of the electric motor and a torque generated by the output unit
wherein the gear box unit comprises at least one worm-worm gearbox and a spur gearbox
wherein a spur gear on an output side of the spur gearbox is designed as a segmented spur gear, which is designed with a toothing only over part of a circumference of the spur gear.

17. An actuator for rotationally driving a vehicle flap, the actuator comprising:
an electric motor which has an output shaft with a central axis about which the output shaft rotates in response to activation of the electric motor, and which is configured to provide a drive force by means of which the vehicle flap can be displaced;
an output unit which is in force-transmitting connection with the electric motor in such a manner that activation of the electric motor causes a rotational displacement of the output unit about an axis of rotation of the output unit; and
a mounting unit which is configured to support the actuator in force-transmitting connection with a superordinate assembly relative to the output unit, such that, upon activation of the electric motor, a displacement of the output unit relative to the mounting unit takes place,
wherein the center axis of the output shaft of the electric motor is spaced from and substantially parallel to the axis of rotation of the output unit,
wherein the actuator comprises a gear box unit which is configured to provide a transmission ratio between a torque generated by the output shaft of the electric motor and a torque generated by the output unit,
wherein the mounting unit is connected in a force-transmitting manner to a housing of the actuator,
wherein a portion of an inner wall of the housing is configured to provide an axial end location for a shaft which is arranged within the housing,
wherein the housing has stiffening ribs on an exterior side, which ribs project outwards from the housing exterior and extend radially away from the axial end location for the shaft and/or around the axial end location for the shaft in a manner concentric thereto.

18. An actuator for rotationally driving a vehicle flap, the actuator comprising:
an electric motor which has an output shaft with a central axis about which the output shaft rotates in response to activation of the electric motor, and which is configured to provide a drive force by means of which the vehicle flap can be displaced;

an output unit which is in force-transmitting connection with the electric motor in such a manner that activation of the electric motor causes a rotational displacement of the output unit about an axis of rotation of the output unit; and a mounting unit which is configured to support the actuator in force-transmitting connection with a superordinate assembly relative to the output unit, such that, upon activation of the electric motor, a displacement of the output unit relative to the mounting unit takes place, wherein the center axis of the output shaft of the electric motor is spaced from and substantially parallel to the axis of rotation of the output unit, wherein the actuator comprises a clutch which is configured to interrupt power transmission from the output shaft of the electric motor to the output unit in its disengaged state or to produce the same in its engaged state, wherein the clutch can be displaced between its engaged state and its disengaged state using a further electric motor, which is designed separately from the electric motor of the actuator.

* * * * *